United States Patent
Shih et al.

(12)

(10) Patent No.: US 6,631,507 B2
(45) Date of Patent: Oct. 7, 2003

(54) TIMING SIGNAL GENERATION FOR CHARGE-COUPLED DEVICE

(75) Inventors: Chen-Hsiang Shih, Chang-Hua Hsien (TW); Chen-Ho Lee, Hsinchu (TW)

(73) Assignee: Umax Data Systems, Inc., Hsinchu (TW)

( * ) Notice: Subject to any disclaimer, the term of this patent is extended or adjusted under 35 U.S.C. 154(b) by 25 days.

(21) Appl. No.: 09/967,711

(22) Filed: Sep. 27, 2001

(65) Prior Publication Data

US 2003/0061584 A1 Mar. 27, 2003

(51) Int. Cl.[7] ............................................... G06F 17/50
(52) U.S. Cl. ..................................... 716/6; 716/4
(58) Field of Search ............................... 716/1–14

(56) References Cited

U.S. PATENT DOCUMENTS 4,216,465 A  *  8/1980  Huelsman et al. .......... 341/138
4,646,119 A  *  2/1987  Kosonocky .................. 377/60
4,873,647 A  * 10/1989  Banki et al. .................. 716/1

* cited by examiner

Primary Examiner—Matthew Smith
Assistant Examiner—Sun James Lin
(74) Attorney, Agent, or Firm—J. C. Patents

(57) ABSTRACT

A method of generating timing signals for a charge-coupled device. A plurality of input timing signals produced by an application specific integrated circuit according to a system clock is transmitted to the charge-coupled device. The programmable timing signals for the charge-coupled device are produced by determining the position of each cycle for these input timing signal, adjusting each cycle of the input timing signals in each system clock cycle and downloading their relationship into the application specific integrated circuit by programming.

8 Claims, 3 Drawing Sheets

TIMING SIGNAL GENERATION FOR CHARGE-COUPLED DEVICE

BACKGROUND OF THE INVENTION

1. Field of Invention

The present invention relates to a method of generating timing signals. More particularly, the present invention relates to a method of generating timing signal for controlling a charge-coupled device.

2. Description of Related Art

A number of factors may affect the scanning speed of a scanner or a digital camera. Factors including revolving speed of stepper motor (for a scanner), the number of sensor cells within a charge-coupled device, pixel resolution, the setting of clocking signals during operation are a few of the major ones. In general, these factors are adjusted according to the type of functions desired by a particular scanner or digital camera.

FIG. 1 is a block diagram showing a portion of the circuit inside a conventional scanner. As shown in FIG. 1, intensity of light captured by a charge-coupled device 102 is converted into an analogue signal and then transmitted to an analogue front-end processor 106 inside an application specific integrated circuit 104. The analogue front-end processor 106 is a device for converting analogue signal into digital signal and generating corresponding clocking signals. The analogue front-end processor 106 converts the analogue signal from the charge-coupled device 102 into a digital signal and transmits the digital signal to a digital signal processor 108 for further processing.

The charge-coupled device 102 needs several clocking signals for convening external light intensity to an analogue signal. The required clocking signals are provided by the analogue front-end processor 106. FIG. 2 is a series of timing diagrams showing the clocking signals submitted to a conventional charge-coupled device during operation. The analogue front-end processor 106 provides input timing shift register signals Φ1, Φ2 to the charge-coupled device 102. A cycle in these timing diagrams is actually composed of a plurality of system clock cycles. For example, as shown in FIG. 2, each cycle in the shift register clock cycles Φ1, Φ2 comprises 12 system clock (SystemClk) cycles.

In FIG. 1, light intensity sensed by the sensor cell (not shown) in the charge-coupled device 102 is stored as electric charges within a shift register (not shown) inside the charge-coupled device 102. According to the shift register clock cycles Φ1, Φ2, the shift register transfers the stored electric charges to a pixel processing circuit (not shown) also inside the charge-coupled device 102. When the shift register clock signal Φ1 drops from a 'H' to a 'L' logic level and the shift register clock signal Φ2 rises from a 'L' to a 'H' logic level as shown in FIG. 2 (the $7^{th}$ clock cycle), electric charges stored inside another shift register (not shown) are transmitted to the pixel processing circuit. In a similar manner, electric charges stored in any number of shift registers (not shown) are transferred to the pixel processing circuit (not shown) of the charge-coupled device 102.

Reset signal RS and positioning signal CLP are operating cycles for the charge-coupled device 102. In the third clock cycle, the reset signal RS is at a 'L' logic level (low potential) and the analogue front-end processor 106 generates a reset voltage to flush out the former electric signals within the charge-coupled device 102. In the fourth clock cycle, the reset signal RS changes from 'L' to 'H' (a high potential) and the positioning signal CLP changes from a 'H' to a 'L' logic level. The analogue front-end processor 106 samples a positioning voltage at time node CDS1. The positioning voltage serves as a reference voltage for the analogue front-end processor 106. In the sixth clock cycle, the positioning signal CLP changes back from 'L' to 'H' and the analogue front-end processor 106 samples a charge voltage at time node CDS2. The charge voltage is derived from the charge signal sent from the shift register (not shown) to the analogue front-end processor 106. Voltage difference between the positioning voltage sampled at time CDS1 and the charge voltage sampled at time CDS2 is the brightness value of a first pixel recorded by the charge-coupled device 102 (refer to FIG. 1). The brightness value is registered as an analogue signal.

The phase shift clock signal of a shift register inside a conventional charge-coupled device often has a fixed duty cycle. When a scanner is conducting a low resolution scanning, a faster image processing speed is achieved by using a higher frequency for the phase shift signal. Correspondingly, duty cycle of the analogue front-end processor (time node CDS1 and time node CDS2) is shortened. However, the charge signal from the shift register is submitted in a non-stabilized state. Hence, the signal sampled by the analogue front-end processor is inaccurate and frequency of the pixel processing cycle is increased leading to a high vulnerability to noise interference. Consequently, quality of the scanned image may deteriorate. To produce a high-resolution image, scanning speed of a scanner must slow down. In other words, one must make a compromise between scanning speed and scanning quality.

In addition, the charge-coupled device needs to have different clocking cycles for a scanner capable of scanning different low-resolution images. Therefore, the application specific integrated circuit must be designed anew leading to a slowdown of circuit design turnover.

SUMMARY OF THE INVENTION

Accordingly, one object of the present invention is to provide a method of generating clocking signals for a charge-coupled device capable of increasing scanning speed and image quality for a low-resolution scanning. The method is also adaptable to the clocking requirements of different types of charge-coupled devices so that time for designing the scanning circuit of a scanner is reduced.

To achieve these and other advantages and in accordance with the purpose of the invention, as embodied and broadly described herein, the invention provides a method of generating clocking signals for a charge-coupled device. First, clocking cycle of a shift register signal, a reset signal and a positioning signal related to a charge-coupled device are set. In each cycle of a system clock, for the sampled charge signal that needs to be sampled by the charge-coupled device, cycle of the shift phase register signal corresponding to the charge signal may be extended by an adjustment. For the charge signal that needs to be discarded, cycle of the shift phase register signal corresponding to the charge signal may be shortened by an adjustment. In addition, duration of each cycle for the positioning signal is adjusted in each cycle of the system clock and each cycle of the shift register clock such that the analogue front-end processor can obtain a stable positioning voltage. Furthermore, duration of each cycle for the reset signal is adjusted in each cycle of the system clock and each cycle of the shift register clock corresponding to the charge signal that needs to be discarded. Ultimately, the analogue front-end processor generates a reset voltage to flush away to-be-discarded charge signals. Hence, without changing the internal circuit of an application specific integrated circuit, duty cycle of the shift register signal, the reset signal and the positioning signal may be modified.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
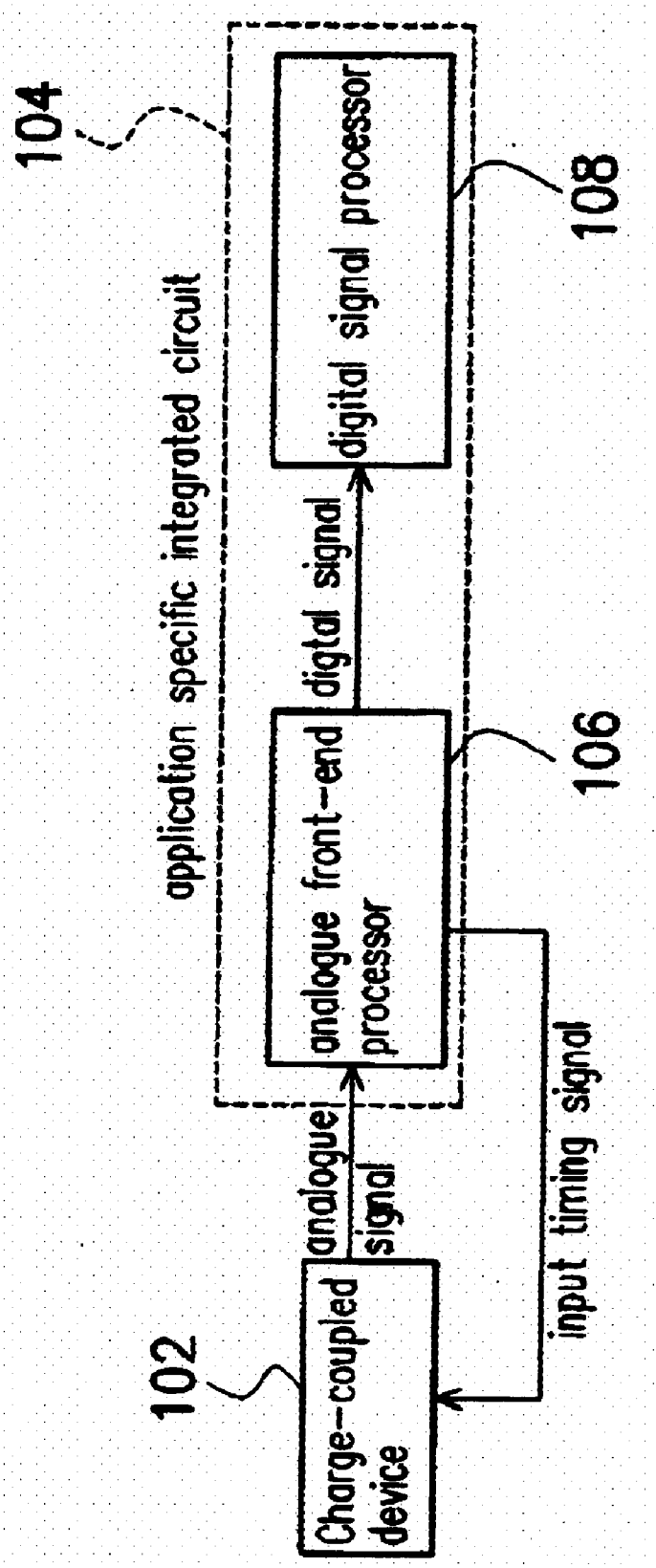
FIG. 1 is a block diagram showing a portion of the circuit inside a conventional scanner.
Figure 2:
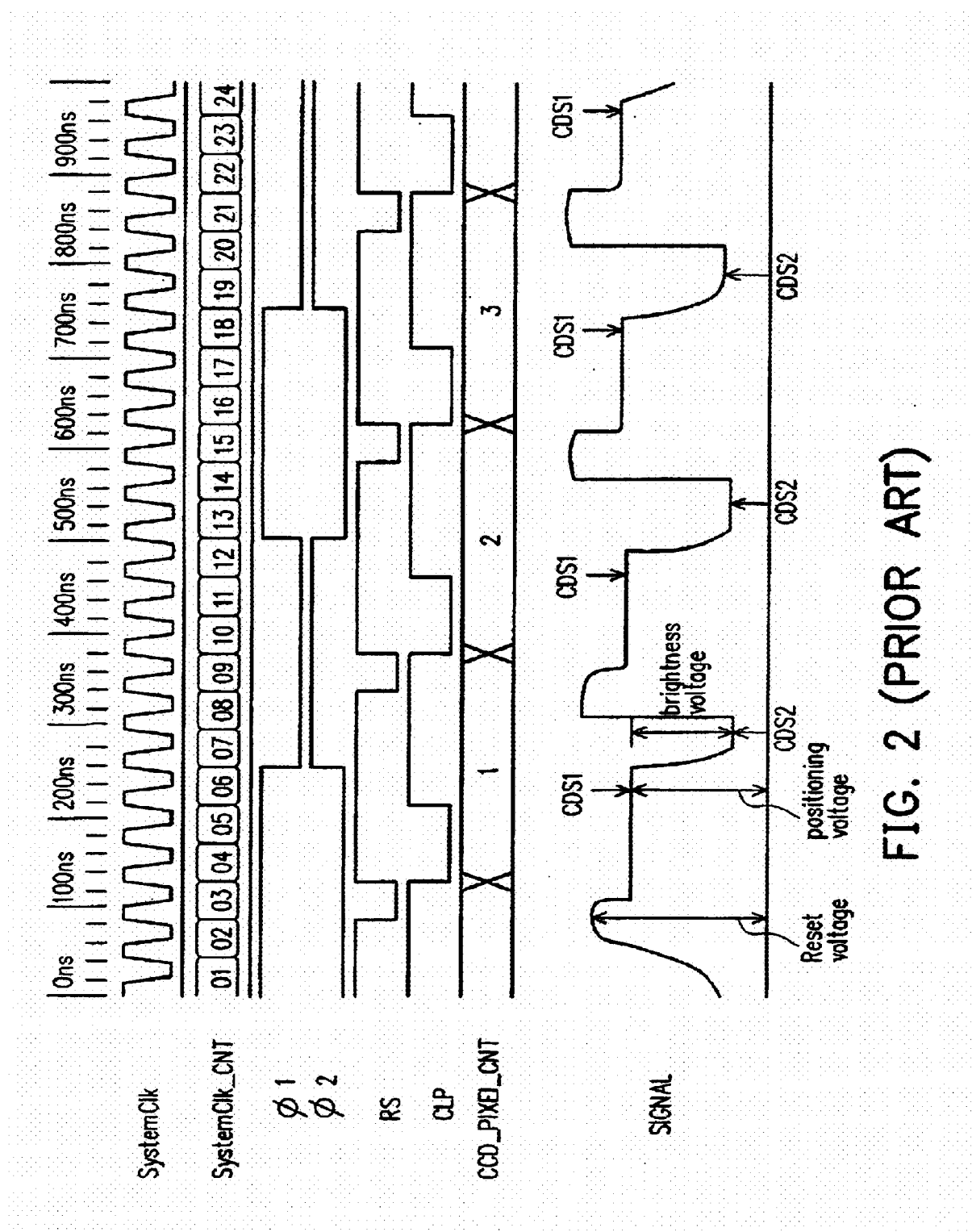
FIG. 2 is a series of timing diagrams showing the clocking signals submitted to a conventional charge-coupled device during operation.

Reference will now be made in detail to the present preferred embodiments of the invention, examples of which are illustrated in the accompanying drawings. Wherever possible, the same reference numbers are used in the drawings and the description to refer to the same or like parts.

Figure 3:
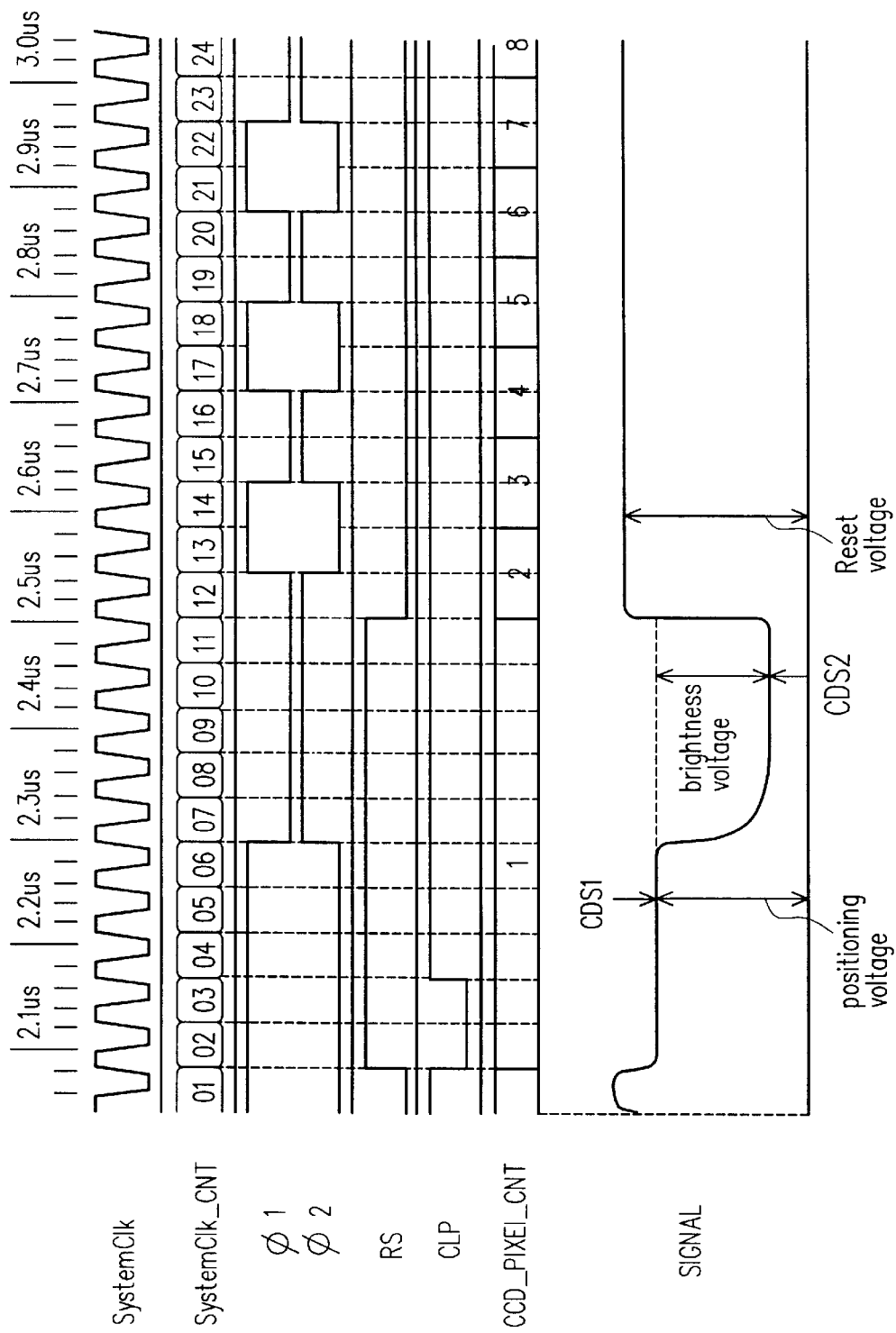
FIG. 3 is a series of timing diagrams showing the clocking signals of an operating charge-coupled device according to this invention.

FIG. 3 is a series of timing diagrams showing the clocking signals of an operating charge-coupled device according to this invention. In this embodiment, the scanner uses a 1200 dpi charge-coupled device to scan an image and produce a one-eighth or 150 dpi low-resolution image output. In FIG. 3, 24 system clock (SystemClk) cycles are shown. The first cycle of the shift register clocking signals $\Phi 1$, $\Phi 2$ (also the fifth, the ninth, . . . ) occupies 12 cycles of the system clock. The second to fourth (2~4) cycles of the shift register clocking signals $\Phi 1$, $\Phi 2$ (also the 6~8, 10~12, . . . ) occupies four cycles of the system clock. Different system clock cycles for the shift register clock signal are used because the charge signal sampled by the charge-coupled device may be extended or contracted. The charge signal is extended by increasing the number of system cycles in each shift register clock cycle (for example, the first, fifth, ninth, . . . cycle of the shift register clock signals $\Phi 1$, $\Phi 2$ all occupy 12 system cycles). Similarly, to discard some of the charge signal, the number of system cycles for each shift register clock cycle (for example, the 2~4, 6~8, 10~12 . . . cycle of the shift register clock signals $\Phi 1$, $\Phi 2$ all occupy 4 system cycles) is reduced.

In the first system cycle, the reset signal RS is at a 'L' logic level. The analogue front-end processor 106 (refer to FIG. 1) generates a reset voltage to flush away previous voltage signal in the charge-coupled device 102 (refer to FIG. 1). In the second system cycle, the reset signal changes from 'L' to 'H' (a high potential) and the positioning signal CLP changes from 'H' to 'L'. The analogue front-end processor 106 samples a positioning voltage at time node CDS1. The positioning voltage serves as a reference voltage for the analogue front-end processor 106. In the fourth system cycle, the positioning signal CLP changes back from 'L' to 'H' and the analogue front-end processor 106 sampled a charge voltage at time node CDS2. The charge voltage is the voltage formed by the charge signal transmitted from the shift register (not shown) to the analogue front-end processor 106. The voltage difference between the positioning voltage sampled at time CDS1 and the charge voltage sampled at time CDS2 is the brightness value at the first pixel of the charge-coupled device 102. The brightness value is transmitted as an analogue signal. The system clock and the first cycle of the shift register signals $\Phi 1$, $\Phi 2$ for sampling charge signal are used to adjust the duration of the positioning signal CLP level. Ultimately, the charge-coupled device is able to secure a stable positioning voltage.

Since the scanner performs a scanning operation using a one-eight resolution, the 2~8 charge signals sensed by the charge-coupled device 102 are discarded. Hence, in the 12~24 system cycle, the reset signal RS is at a 'L' logic level. In other words, potential produced by the analogue front-end processor 106 is at the reset voltage. The 2~8 charge signal within the shift register (not shown) are all reset. The system clock and the 2~8 cycles of the shift register signals $\Phi 1$, $\Phi 2$ for discarding the charge signal are used to adjust the duration of the reset signal RS level. Thus, the analogue front-end processor 106 generates a rest voltage to flush out all to be-discarded charge signals.

In brief, the scanner is able to adjust the operating cycles of a charge-coupled device according to the desired image quality and scanning speed. For example, to improve image quality, the number of system cycles for the positioning signal CLP may increase from 2 to 3 so that a stable positioning voltage is obtained at time node CDS1. Alternatively, duration for the analogue front-end processor to sample charge signal is increased so that a stable charge voltage is obtained at time node CDS2. That is, the duration of the first cycle of the shift register signal $\Phi 1$ is increased and the position of 'H' to 'L' level transition of the reset signal is adjusted. With this arrangement, a low-resolution image can have a high-resolution image quality. To increase the scanning speed of a scanner, one method is to reduce the four system clock cycles required by the $2^{nd}$ to $4^{th}$ cycles of the shift register signals $\Phi 1$, $\Phi 2$ to two system clock cycles only.

In FIG. 3, to produce the scan image having the aforementioned quality and speed in a low-resolution scanning, the relationship between the shift register timing signals $\Phi 1$, $\Phi 2$, the reset signal RS, the positioning signal CLP and the system clock is downloaded by programming into the application specific integrated circuit 104 (refer to FIG. 1). For example, in the first system clock cycle, the shift register signal $\Phi 1$ is 'H', the shift register signal $\Phi 2$ is 'L', the reset signal RS is 'L' and the positioning signal CLP is 'H'. These states are downloaded into the application specific integrated circuit 104 (refer to FIG. 1) in an address that corresponds to the first cycle of the system clock. In the second system clock cycle, the shift register signal $\Phi 1$ is 'H', the shift register signal $\Phi 2$ is 'L', the reset signal RS is 'H' and the positioning signal CLP is 'L'. Similarly, these states are downloaded into the application specific integrated circuit 104 in an address that corresponds to the second cycle of the system clock. Ultimately, the states regarding the shift register signals $\Phi 1$, $\Phi 2$, the reset signal RS and the positioning signal CLP that corresponds to all 24 clock cycles of the clock system are downloaded into the application specific integrated circuit 104. To modify the image-scanning resolution or change the timing of the shift register signals $\Phi 1$, $\Phi 2$, the reset signal RS or the positioning signal CLP, new sets of signaling data may be re-programmed into the application specific integrated circuit 104. There is no need to temper with the circuit inside the application specific integrated circuit 104.

In conclusion, scanning speed of a low-resolution scanning operation is increased through changing the duration of various duty cycles controlling a charge-coupled device. In addition, there is no need to redesign the circuit inside an application specific integrated circuit for a change in resolution. Duration of various operating signals can be downloaded into the application specific integrated circuit by programming. Hence, time for designing the internal circuit of an application specific integrated circuit is shortened.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of generating timing signals for a charge-coupled device, comprising the steps of:

determining cycles of each input timing signal sent to control the charge-coupled device; and adjusting position of each cycle of the input timing signals according to each cycle of a system clock;

wherein each duty cycle of the input timing signal for the charge-coupled device determines each duty cycle of a shift register timing signal of the charge-coupled device, and for a charge signal that needs to be sampled by the charge-coupled device, duration of the cycle of the shift register signal corresponding to the charge signal is extended, and for another charge signal that needs to be discarded by the charge-coupled device, duration of the cycle of the shift register signal corresponding to the charge signal is shortened.

2. The method of claim 1, wherein the cycle of the shift register timing signal corresponding to the to-be-sampled charge signal is adjusted through changing cycle duration of a positioning signal so that an analogue front-end processor inside an application specific integrated circuit can receive a stable positioning voltage.

3. The method of claim 1, wherein the cycle of the shift register timing signal corresponding to the to-be-discarded charge signal is adjusted through changing cycle duration of a reset signal so that an analogue front-end processor inside an application specific integrated circuit can produce a reset voltage for flushing away the to-be-discarded charge signal.

4. The method of claim 1, wherein input timing signals produced by an application specific integrated circuit according to a system clock are transmitted to the charge-coupled device.

5. The method of claim 4, wherein a position of each cycle of the input timing signals relative to each cycle of the system clock is programmed into the application specific integrated circuit.

6. A method of generating timing signals for controlling a charge-coupled device, comprising the steps of:

determining each cycle of a shift register signal, a reset signal and a positioning signal for the charge-coupled device;

in each cycle of a system clock, lengthening the cycle of the shift register signal corresponding to a charge signal that needs to be sampled by the charge-coupled device; and shortening the cycle of the shift register signal corresponding to another charge signal that needs to be discarded by the charge-coupled device;

in each cycle of the system clock and each cycle of the shift register signal, adjusting cycle duration of the positioning signal so that an analogue front-end processor can obtain a stable voltage; and in each cycle of the system clock and each cycle of the shift register signal that corresponds to the to-be-discarded charge signal, adjusting cycle duration of the reset signal so that the analogue front-end processor generates a reset signal to flush away the to-be-discarded charge signal.

7. The method of claim 6, wherein input timing signals produced by an application specific integrated circuit according to a system clock are transmitted to the charge-coupled device.

8. The method of claim 7, wherein a position of each cycle of the shift register signal, the positioning signal and the reset signal relative to each cycle of the system clock is programmed into the application specific integrated circuit.

* * * * *